(12) United States Patent  
Sakai (10) Patent No.: US 7,920,355 B2  
(45) Date of Patent: Apr. 5, 2011

(54) METHOD AND APPARATUS FOR REPRODUCING SERVO DATA FROM A DISCRETE TRACK MEDIA IN A DISK DRIVE

(75) Inventor: Yuji Sakai, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 164 days.

(21) Appl. No.: 12/397,655

(22) Filed: Mar. 4, 2009

(65) Prior Publication Data

US 2009/0168231 A1    Jul. 2, 2009

Related U.S. Application Data

(63) Continuation of application No. PCT/JP2008/061269, filed on Jun. 13, 2008.

(30) Foreign Application Priority Data

Jul. 30, 2007    (JP) ................................. 2007-197898

(51) Int. Cl.  
*G11B 5/596* (2006.01)  
*G11B 5/09* (2006.01)

(52) U.S. Cl. ...................................... 360/77.08; 360/48

(58) Field of Classification Search ......................... None  
See application file for complete search history.

(56) References Cited

U.S. PATENT DOCUMENTS

| | | | |
|---|---|---|---|
| 7,164,548 B2 | 1/2007 | Hattori et al. | |
| 2006/0012903 A1* | 1/2006 | Asakura et al. | ................. 360/48 |
| 2006/0077880 A1 | 4/2006 | Moriya et al. | |
| 2006/0193083 A1 | 8/2006 | Soeno et al. | |
| 2006/0203386 A1 | 9/2006 | Soeno et al. | |
| 2006/0269791 A1 | 11/2006 | Okawa et al. | |

FOREIGN PATENT DOCUMENTS

| | | |
|---|---|---|
| JP | 2004-295991 | 10/2004 |
| JP | 2005-293730 | 10/2005 |
| JP | 2006-085819 | 3/2006 |
| JP | 2006-269043 | 10/2006 |

OTHER PUBLICATIONS

International Search Report dated Jul. 19, 2008 for PCT/JP2008/061269.

* cited by examiner

*Primary Examiner* — Daniell L Negrón  
*Assistant Examiner* — Regina N Holder  
(74) *Attorney, Agent, or Firm* — Pillsbury Winthrop Shaw Pittman, LLP (57) ABSTRACT

According to one embodiment, disclosed herein is a disk drive that has a disk of discrete-track media (DTM) type. The DTM disk has servo regions. Each servo region has dividing grooves and non-servo data parts. Each dividing grooves extends along the centerline of any projecting region having a width larger than a prescribed value. Each non-servo data part suppresses reproduction noise. The disk drive has a read/write channel that includes a reproduced-signal processing unit. This unit reproduces servo data from each servo region.

7 Claims, 7 Drawing Sheets

METHOD AND APPARATUS FOR REPRODUCING SERVO DATA FROM A DISCRETE TRACK MEDIA IN A DISK DRIVE

CROSS REFERENCE TO RELATED APPLICATIONS

This is a Continuation Application of PCT Application No. PCT/JP2008/061269, filed Jun. 13, 2008, which was published under PCT Article 21(2) in English.

This application is based upon and claims the benefit of priority from Japanese Patent Application No. 2007-197898, filed Jul. 30, 2007, the entire contents of which are incorporated herein by reference.

BACKGROUND

1. Field

One embodiment of the present invention relates to a disk drive using a disk of discrete-track media type. More particularly, the invention relates to a technique of reproducing servo data from the disk.

2. Description of the Related Art

In the field of disk drives, a representative example of which is a hard disk drive, a disk of the discrete-track media type (hereinafter, referred to as a DTM disk or disk, as needed) has been attracting attention in recent years. (See, for example, Jpn. Pat. Apply. KOKAI Publication No. 2006-85819.) On the DTM disk, servo regions are provided, in which servo data is recorded. Each servo region has a projection-depression pattern consisting of projecting magnetic layers and concave nonmagnetic layers (actually, spaces).

The DTM disk has a data region that is the user-data recording region. The data region is composed of a number of data tracks that are annular magnetic layers. The data tracks are spaced apart from one another by spaces (nonmagnetic layers), which are called guard bands.

In the process of manufacturing the DTM disk, the surface of the unfinished disk is made flat and smooth after the projection-depression pattern consisting of projecting magnetic layers and depressions (spaces), in order to ensure the floating stability of the slider, i.e., the head body of the magnetic head. In the surface-smoothing process, nonmagnetic or soft-magnetic material is first filled in the grooves made in the surface of the DTM disk and then the unnecessary part of the material is removed by etching, imparting a flat surface to the DTM disk.

Here arises a problem. If a projecting magnetic layer (i.e., projecting region) formed in any the servo region has a width that is relatively broad (or long) or has a larger width than that of the data tracks (as measured in the radial direction of the DTM disk), the unnecessary part of the magnetic material cannot be thoroughly removed by the etching. Inevitably, the material remains on the projecting region. In many cases, the DTM disk cannot have a flat surface.

The above-identified publication proposes a method of imparting a sufficiently flat surface to the DTM disk. In this method, a groove (nonmagnetic layer) of a preset width is cut in each broad projecting region, thus splitting the projecting region into two regions. This method can indeed impart a flat surface to the DTM disk, but results in the following problem in the process of reproducing the servo data from the DTM disk.

In each broad projecting region on the DTM disk, a bit pattern, which is a part of the servo data, is formed. In the disk drive, the head reads or reproduces a signal from the projecting region, and the signal reproduced is processed, decoding the bit pattern. While the signal is processed, noise develops at the groove (nonmagnetic layer) cut in the broad projecting region. The noise may degrade the decoding efficiency in the reproduced-signal processing.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, there is provided a disk drive that uses a DTM disk having a sufficiently flat surface and that can reliably reproduce servo data from the DTM disk.

(Configuration of the Disk Drive)

Figure 1:
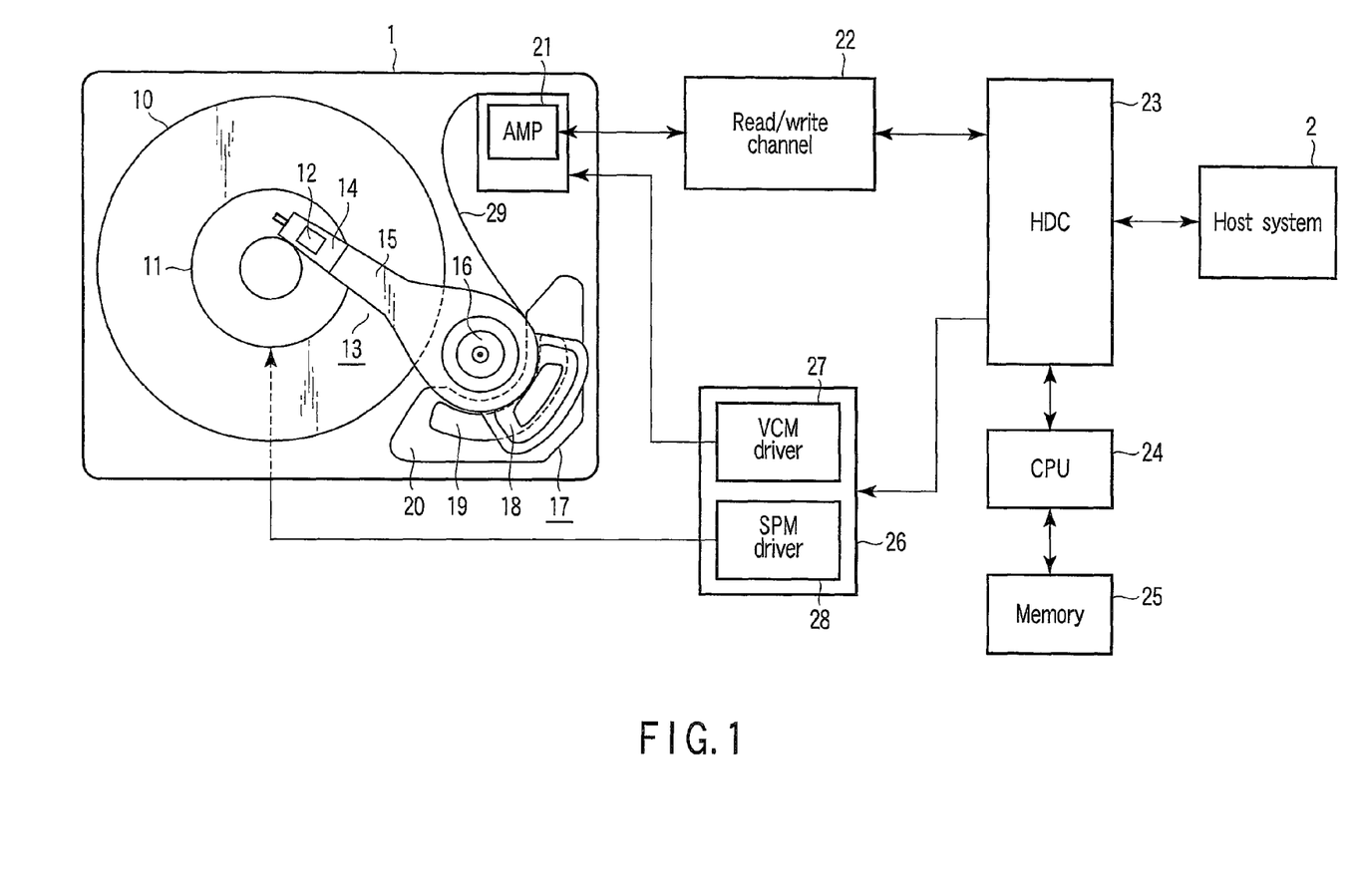
FIG. 1 is a block diagram showing the configuration of a disk drive according to an embodiment of the present invention.

According to an embodiment, FIG. 1 is a block diagram showing the configuration of a disk drive according to an embodiment of this invention.

As FIG. 1 shows, the disk drive 1 has a disk 10 of the discrete-track media type (DTM disk), a spindle motor (SPM) 11, a magnetic head 12, and an actuator 13. The SPM 11 can rotate the disk 10. The magnetic head 12 is mounted on the actuator 13.

The disk 10 is a disk for perpendicular magnetic recording. As will be described later, the disk 10 has servo regions and a data region on one surface (see FIG. 3). Each servo region has a magnetic projection-depression pattern and a nonmagnetic projection-depression pattern.

The magnetic head 12 has a slider (i.e., head body), a read head, and a write head. The read head and write head are mounted on the slider and spaced from each other. The read head can read servo data and user data from the servo region and data region of the disk 10, respectively, to perform a read operation. The write head can record user data in the data region, to perform a write operation.

The actuator 13 has a suspension 14, an arm 15, a pivot 16, and a voice coil motor (VCM) 17. The suspension 14 holds the magnetic head 12. The arm 15 can rotate around the pivot 16. The VCM 17 generates a drive force. The VCM 17 is comprises a coil 18, a magnet 19, and a yoke 20. The VCM 17 is driven and controlled by a current supplied from a VCM driver 27. The VCM driver 27 supplies the current through a flexible circuit board 29. When controlled by a microprocessor (CPU) 24 (described later) which performs servo control, the actuator 13 moves the magnetic head 12 over the disk 10, in a radial direction of the disk 10, positioning the magnetic head 12 at a target position (i.e., target track).

The disk drive 1 further has a head amplifier unit 21, a read/write channel 22, a hard disk controller (HDC) 23, a microprocessor (CPU) 24, a memory 25, and a motor driver 26. All these components 22 to 26, except for head amplifier unit 21, are mounted on a printed circuit board provided in the housing of the disk drive 1. The head amplifier unit 21 is mounted on the flexible circuit board 29.

The head amplifier unit 21 is electrically connected to the magnetic head 12 and read/write channel 22. The head amplifier unit 21 receives a reproduced signal from the read head and amplifies the signal, which is supplied to the read/write channel 22. The head amplifier unit 21 also receives a write signal from the read/write channel 22 and converts this signal to a current, which is supplied to the write head.

The read/write channel 22 is a signal-processing circuit that processes record signals (write signals) and reproduced signal (read signals). The read/write channel 22 also reproduces servo data and records and reproduces the user data. The channel 22 includes a reproduced-signal processing unit (see FIG. 2), which processes a signal the read head has read from the servo region of the disk 10, thus decoding the servo data.

The hard disk controller 23 (hereinafter referred to as disk controller) functions as an interface between the hard disk drive 1 and a host system 2 (a personal computer or a digital apparatus). The disk controller 23 controls the transfer of user data between the disk drive 1 and the host system 2. The disk controller 23 also controls the read/write channel 22 so that data may be read and written from and in the disk 10. The disk controller 23 incorporates an error correcting (EC) unit and can therefore correct errors in the reproduced user data supplied from the read/write channel 22.

The CPU 24 is the main controller provided in the disk drive 1. The CPU 24 performs a head-positioning control (servo control) to position the magnetic head 12 at a target track. The servo control includes a seek operation and a track-following operation. The CPU 24 controls and drives the VCM 17 (which in turn drives the actuator 13), by inputting a control value (control voltage) to the VCM driver 27 via the disk controller 23. The memory 25 includes a RAM, a ROM and a flash EEPROM and stores the control programs and various control data items, which the CPU 24 executes and uses.

The motor driver 26 is a driver IC that incorporates the VCM driver 27 and an SPM driver 28. The VCM driver 27 supplies a drive current to the coil 18 of the VCM 17. The SPM driver 28 supplies a drive current to the SPM 11.

(Process of Reproducing Servo-Data Signals)

Figure 2:
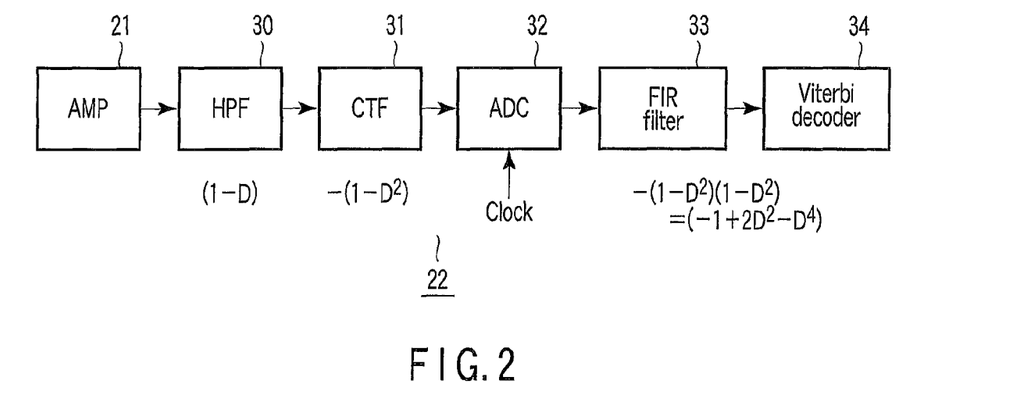
FIG. 2 is a block diagram explaining the structure of the reproduced-signal processing unit according to the embodiment.

FIG. 2 is a block diagram showing the major components of the reproduced-signal processing unit that is incorporated in the read/write channel 22. The reproduced-signal processing unit can process signals reproduced from the user data, too.

As FIG. 2 shows, the reproduced-signal processing unit has a high-pass filter (HPF) 30, a continuous time filter (CTF) 31, an analog-to-digital (A/D) converter 32, and a finite impulse response (FIR) filter 33, and a Viterbi decoder 34.

The disk drive 1 according to this embodiment is a drive that uses a DTM disk 10 for perpendicular magnetic recording. The read/write channel 22 is therefore designed to accomplish perpendicular magnetic recording. In the read/write channel 22, the transfer characteristic of the read channel that processes the signal reproduced from the servo data is modeled as transfer function (1+D).

The HPF 30 is a high-pass filter that equalizes the waveform of the reproduced signal output from the head amplifier unit 21. That is, the HPF 30 performs waveform equalization on the input signal, rendering the transfer characteristic almost equivalent to transfer function 1−D. The CTF 31 comprises a differentiator and a low-pass filter (LPF). The CTF 31 performs waveform equalization on a reproduced signal output from the HPF 30, removing high-band noise and rendering the transfer characteristic almost equivalent to transfer function $-(1+D^2)$.

The A/D converter 32 samples the waveform of the reproduced signal output from the CTF 31, at the pulse intervals of a clock signal synchronized with a sync signal that has been read from the preamble region included in the servo region of the disk 10. In other words, the A/D converter 32 converts the amplitudes at sampling points. Thus, it converts the waveform of the reproduced signal (i.e., analog signal) to the waveform of a digital signal.

The FIR filter 33 is a digital waveform equalizer that comprises a digital filter. It performs waveform equalization on the digital signal, changing the signal to one adaptive to the decoding ability of the Viterbi decoder 34. More specifically, the Viterbi decoder 34 has a response characteristic of $-1+2D^2-D^4$ and decodes the servo data by using this response characteristic. The FIR filter 33 equalizes the waveform of the digital signal, so that the Viterbi decoder 34 may receive an input signal (digital signal) that has response characteristic of $-(1-D^2)(1+D^2)=-1+2D^2-D^4$. Note that the FIR filter 33 performs waveform equalization on the input digital signal by using preset filter parameters, in order to generate a signal adaptive to the decoding ability of the Viterbi decoder 34.

(Structure of the DTM Disk)

Figure 3:
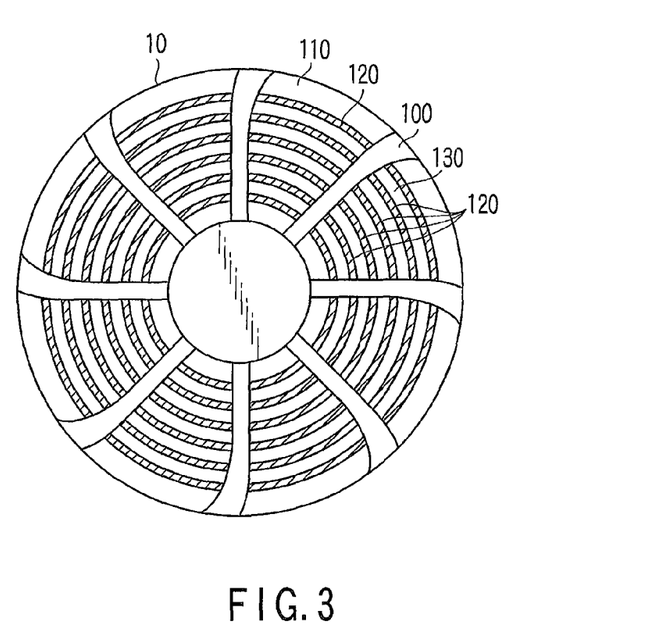
FIG. 3 is a diagram schematically showing a disk according to the embodiment.
Figures 4A, 4B, 4C:
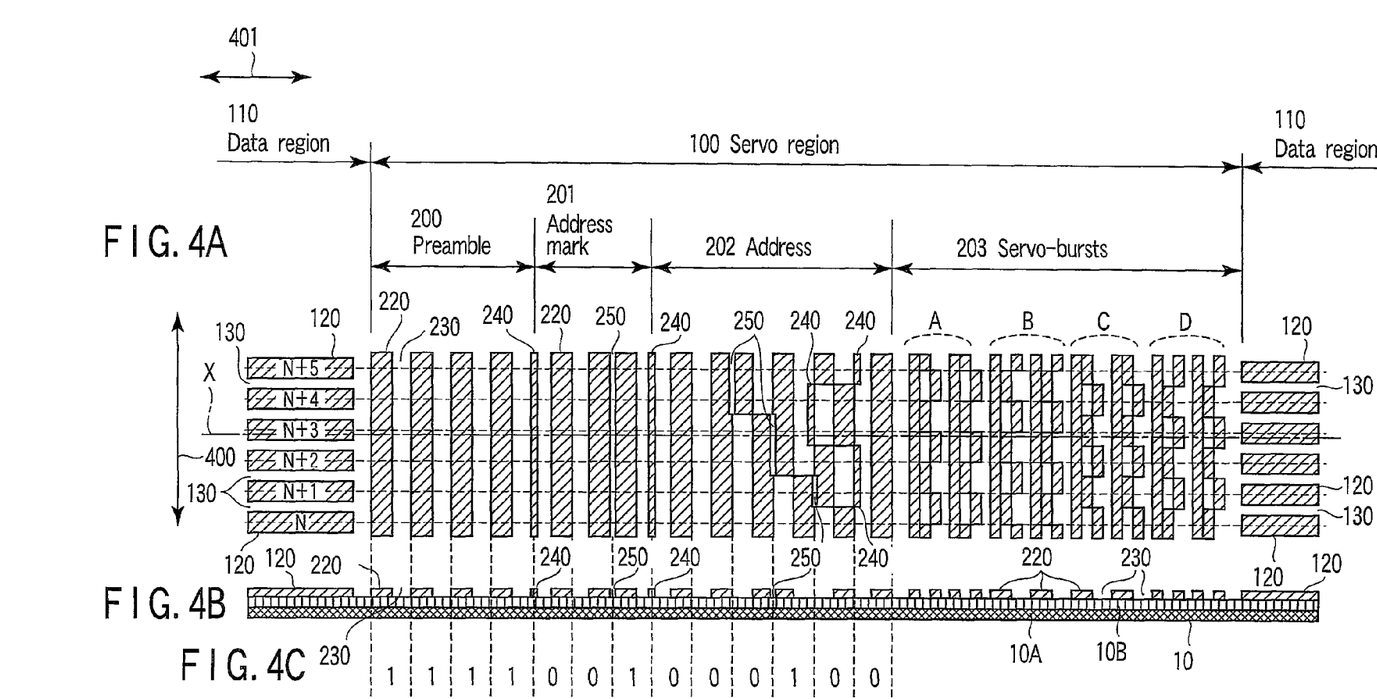
FIGS. 4A to 4D are diagrams explaining the structure of a disk medium according to the embodiment.

FIG. 3 and FIGS. 4A to 4D are diagrams explaining the structure of the DTM disk 10 according to the present embodiment. In FIG. 4A, arrow 400 indicates the radial direction on the disk 10, and arrow 401 indicates the circumferential direction on the disk 10.

The disk 10 is a disk for perpendicular magnetic recording. As FIG. 3 shows, the disk 10 has servo regions 100 and a data region 110 on one surface. Each servo region 100 has a magnetic projection-depression pattern and a nonmagnetic projection-depression pattern.

The data region 110 is the user-data recording region and is composed of a number of concentric data tracks 120. The data tracks are annular magnetic layers (projecting parts) and spaced apart from one another by annular nonmagnetic guard bands 130, each being a space. Being spaces, the guard bands 130 are annular grooves.

Servo data, which is used to accomplish the positioning of the magnetic head 12, is recorded in the servo regions 100. As FIG. 4A shows, each servo region 100 has a preamble area 200, an address mark region 201, an address data area 202, and a servo-burst pattern area 203.

The preamble area 200 is a recording area for recording sync signals which are to adjust amplitudes and reproduce clock signals. The address mark region 201 is an area from which the head of servo data can be detected. The address data area 202 is an area in which address codes are recorded. One address code represents the address of a track (cylinder), and the other address code represents the address of a sector. The servo-burst pattern area 203 is an area in which servo-burst patterns A to D are recorded. The servo-burst patterns A to D are used to detect various positions in one track.

As FIG. 4C shows, each servo region 100 having the areas 200 to 203 has a magnetic projection-depression pattern that is defined by projecting magnetic regions 220 and depressed nonmagnetic regions 230 (hereinafter called space regions, as is needed). As seen from FIG. 4C, the magnetic projection-depression pattern corresponds to the bit pattern of the servo data.

FIG. 4B is a sectional view taken along line X-X shown in FIG. 4A. As can be understood from FIG. 4B, the disk 10 has been manufactured by forming an under layer 10B on a disk substrate 10A and forming, on the under layer 10B, a magnetic projection-depression pattern that is composed of projecting magnetic regions 120 and 220 and space regions 130 and 230.

In the process of manufacturing the disk 10, the surface of the unfinished disk is made flat and smooth in order to ensure the floating stability of the slider, i.e., the head body of the magnetic head 12. In the surface-smoothing process, non-magnetic or soft-magnetic material is first filled in the spaces (i.e., grooves) made in the surface of the disk 10 and then etched, imparting a flat surface to the disk 10.

Figure 4D:
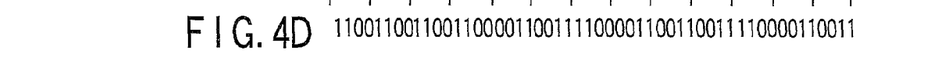

FIG. 4D is a diagram showing recorded code data obtained by subjecting data-bit train consisting of 0s and 1s to bi-phase encoding (modulation).

Hereinafter, the recorded code data thus obtained will be referred to as bi-phase modulated data.

Thus, the servo data consisting of a train of data bits (0s and 1s), excluding servo-burst patterns A to D, is recorded as bi-phase modulated data in each servo region 100 of the disk 10 according to the present embodiment. Therefore, the read/write channel 22 includes a unit that decodes the bi-phase modulated data output from the reproduced-signal processing unit (FIG. 2) (more precisely, the output of Viterbi decoder 34) to servo data, i.e., the original data-bit train.

Figures 5A, 5B:
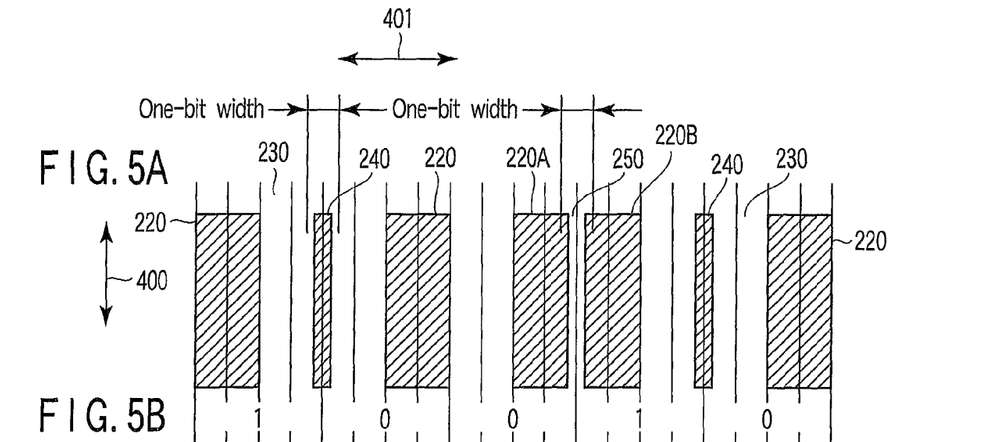
FIGS. 5A to 5C are diagrams explaining a projection-depression magnetic pattern according to the embodiment.

In the bi-phase modulation, each data bit 0 of the servo data is converted to 0011, and each data bit 1 of the servo data is converted to 1100, as can be seen from FIG. 4D. In the bi-phase modulated data, consecutive 0s appear in only two bit patterns, i.e., 00 and 0000, and consecutive 1s appear in only two bit patterns, i.e., 11 and 1111. As FIG. 5A shows, most 0s in the bi-phase modulated data are generated from the magnetic regions (projecting regions) 220, and most 1s in the bi-phase modulated data are generated from the space regions 230.

In each servo region 100, space regions (depressed nonmagnetic regions) 250 are provided. Each space region 250 has a width of 1 bit or less, as measured in the circumferential direction 401 of the disk 10, and is provided in any projecting magnetic region 220 that has a larger width than a prescribed value, as measured in the circumferential direction 401 of the disk 10. The region 250 extends along the centerline of the projecting magnetic region 220, dividing the region 220 into halves. Therefore, the space region 250 will hereinafter be called dividing grooves.

Further, projecting magnetic regions 240 are provided in each space region 100. Each projecting magnetic region 240 has almost the same width (1-bit width or less) as the dividing grooves 250 and is provided in any space region 230 that has a larger width than a prescribed value, as measured in the circumferential direction 401 of the disk 10. The projecting magnetic region 240 will be hereinafter called non-servo data part, so that it may be distinguished from servo data.

(Structures of the Dividing Space and Non-Servo Data Part)

Figure 5C:
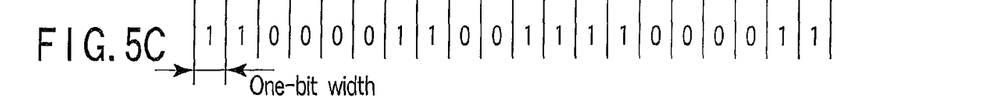

The structure of each of the dividing grooves 250 and that of each non-servo data part 240 will be described, with reference to FIGS. 5A to 5C.

As shown in FIG. 5A, the dividing grooves 250 extend along the centerline of a projecting magnetic region 220 having a larger width than the prescribed value, as measured in the circumferential direction 401 of the disk 10, and therefore divide the region 220 into halves. Note the projecting magnetic region 220 having a larger width than the prescribed value exists in the servo region 100 that has a larger width measured in the circumferential direction 401 of the disk 10 than the width measured in the radial direction 400 of the data track 120 shown in FIG. 4A. In other words, such a projecting magnetic region 220 corresponds to a bit pattern "1111" of the bi-phase modulated data as shown in FIG. 5C. The projecting magnetic region 220 has a width of 1 bit or less as illustrated in FIG. 5A. FIG. 5B is a diagram showing a data-bit train in the servo data, which has yet to be modulated.

As FIG. 5A shows, the non-servo data part 240 extends along the center line of any space region 230 that has a larger width than the prescribed value, as measured in the circumferential direction 401 of the disk 10. Note that the space region 230 having a larger width than the prescribed value exists in the servo region 100 that has a larger width measured in the circumferential direction 401 of the disk 10 than the width measured in the radial direction 400 of the data track 120 shown in FIG. 4A. In other words, such a space region 230 corresponds to a bit pattern "0000" of the bi-phase modulated data as shown in FIG. 5C. Further, the non-servo data part 240 is as broad as the dividing grooves 250. As FIG. 5A shows, the non-servo data part 240 is a projecting magnetic region has a width of 1 bit or less.

Each servo region 100 has such dividing grooves 250 as described above and such non-servo data parts 240 as described above. Having the dividing grooves 250 in each servo region 100, the disk 10 can have a sufficiently flat surface while being manufactured. More specifically, the dividing grooves 250 prevent the filling material from remaining on the projecting magnetic regions 220 having a large width, after filling the material in the space regions and etching the unnecessary parts of the material during the process of smoothing the surface of the DTM disk 10. The DTM disk 10 can therefore have a sufficiently flat surface.

When servo data is reproduced from the servo region 100 during the reproduced-signal processing, noise develops at the dividing grooves 250. The noise may degrade the efficiency of the process of decoding the servo data. In the present embodiment, the efficiency of the process of decoding the servo data is not degraded, because the non-servo data parts 240 cancel the noise developing at the dividing grooves 250 during the reproduced-signal processing.

The advantage resulting from the preservation of the servo-data decoding efficiency will be described later with reference to FIGS. 10A and 10B and FIGS. 11A and 11B.

First Modification

Figures 6A, 6B:
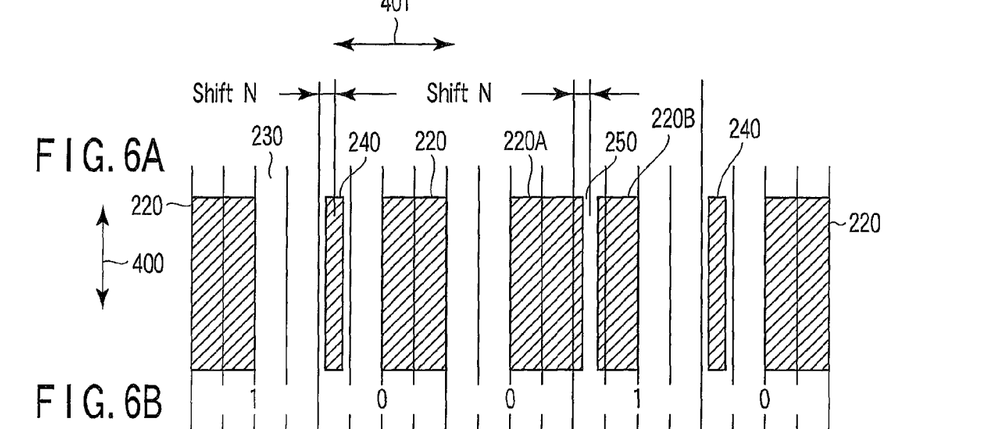
FIGS. 6A to 6C are diagrams explaining a modified projection-depression magnetic pattern according to a first modification of the embodiment.
Figure 6C:
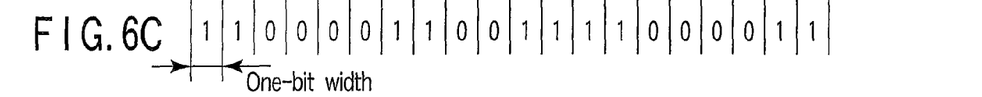

FIGS. 6A to 6C are diagrams explaining a first modification of the projection-depression magnetic pattern shown in FIG. 5A, which consists of dividing grooves 250 and non-servo data parts 240. FIGS. 6B and 6C will not be explained because they are identical to FIGS. 5B and 5C, respectively.

In this modification of the projection-depression magnetic pattern, dividing grooves 250 having a width of 1 bit or less are provided in a projecting magnetic region 220 corresponding to a bit pattern "1111" of the bi-phase modulated data, at a position shifted by preset distance N from the center line of the projecting magnetic region 220 in the circumferential direction 401 of the disk 10. Further, in the space region 230 corresponding to a bit pattern "0000" of the bi-phase modulated data, a non-servo data part 240 having a width of 1 bit or less is provided at a position shifted by preset distance N from the center line of the space region 230.

In this modified projection-depression magnetic pattern, the shift distance N is so limited that one of the two halves 220A and 220B of the projecting magnetic region 220 corresponding to the bit pattern "1111" of the bi-phase modulated data has a width (measured in the circumferential direction of the disk 10) smaller than the width of the data track 120 measured in the radial direction 400 of the disk 10.

Second Modification

FIG. 7 to FIG. 9B are diagrams explaining a second modification of the projection-depression magnetic pattern according to the first embodiment.

Figure 7:
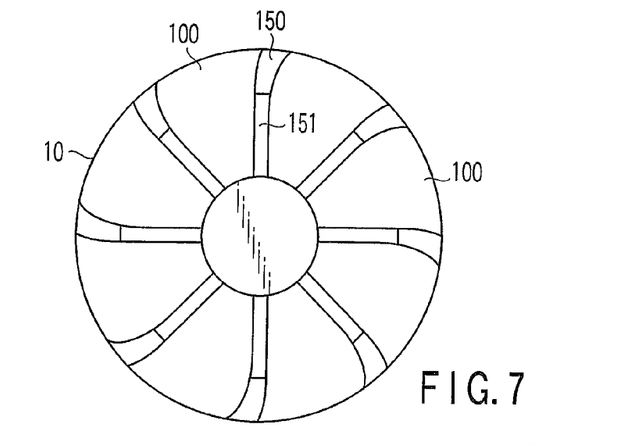
FIG. 7 is a diagram schematically showing a servo region according to a second modification of the embodiment.

As FIG. 7 shows, each servo region 100 of the disk 10 is divided into an outer circumferential region 150 and an inner circumferential region 151. In the outer circumferential regions 150 only, the dividing grooves 250 and non-servo data pars 240 are provided.

Figures 8A, 8B:
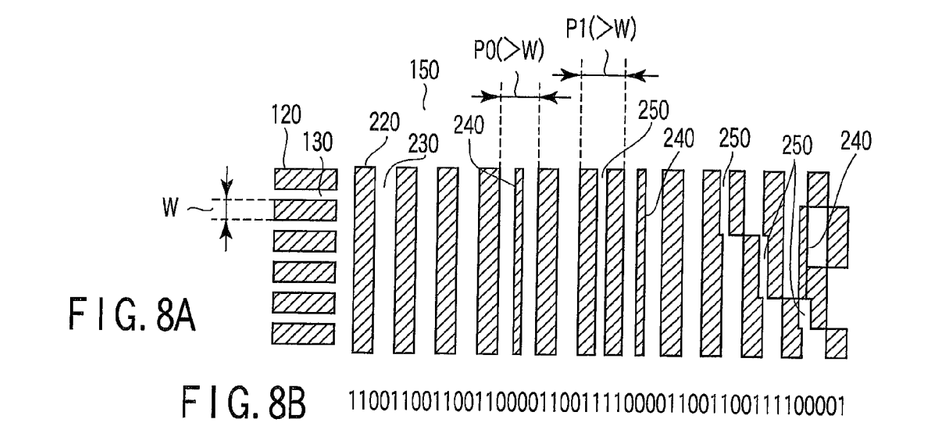
FIGS. 8A and 8B are diagrams explaining the structure of the outer-circumferential part of the servo region according to the second modification.

More precisely, as shown in FIG. 8A, a non-servo data part 240 is provided, extending along the centerline of each space region 230 having a larger width PO (PO>W) than the data track 120 that has width W, as measured in the radial direction 400 of the disk 10. In this case, as shown in FIG. 8B, the space region 230 having large width PO corresponds to the bit pattern "0000" of the bi-phase modulated data.

As FIG. 8A shows, dividing grooves 250 are provided, extending along the centerline of each projecting magnetic region 220 having a larger width P1 (P1>W) than the width W of the data track 120, as measured in the radial direction 400 of the disk 10. In this case, as shown in FIG. 8B, the projecting magnetic region 220 having large width P1 corresponds to the bit pattern "1111" of the bi-phase modulated data.

In the inner circumferential regions 151 of each servo region 100, the width PO of the space region 230 corresponding to the bit pattern "0000" of the bi-phase modulated data is smaller than or equal to the width W of the data track 120, as measured in the radial direction 400 of the disk 10. That is, PO<W or PO=W. Hence, no non-servo data parts 240 are formed along the centerline of any space regions 230 having width PO. Note that FIG. 9B shows the bit pattern of the bi-phase modulated data.

Figures 9A, 9B:
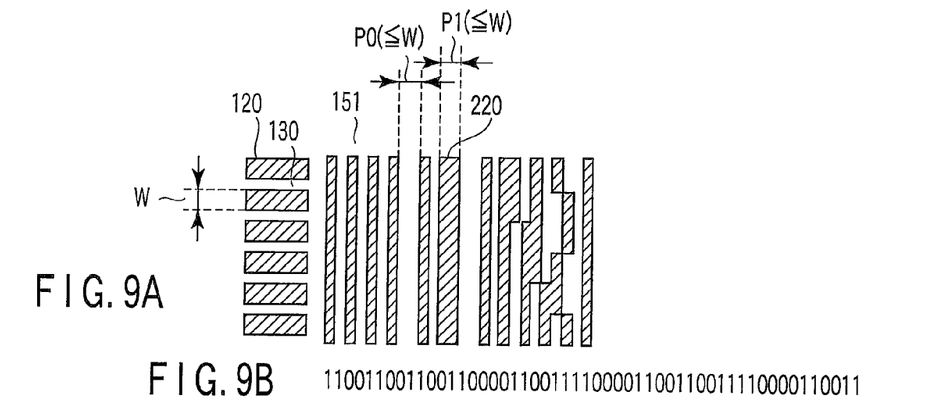
FIGS. 9A and 9B are diagrams explaining the structure of the inner-circumferential part of the servo region according to the second modification.

Similarly, as FIG. 9A shows, the width P1 of the projecting magnetic region 220 corresponding to the bit pattern "1111" of the bi-phase modulated data is smaller than or equal to the width W of the data track 120, as measured in the radial direction 400 of the disk 10. That is, P1<W or P1=W. Hence, no dividing grooves 250 are formed along the centerline of any projecting magnetic regions 220 having width P1.

(Method of Reproducing the Servo Data)

A method of reproducing (decoding) the servo data, according to the present embodiment will be explained, with reference to FIG. 2, FIGS. 10A and 10B and FIGS. 11A and 11B.

As indicated above, the read head of the head 12 reads the servo data recorded in the servo region 100 in the present embodiment. The reproduced analog signal corresponding to the servo data and output from the read head is supplied via the head amplifier unit 21 to the read/write channel 22. The read/write channel 22 decodes the reproduced analog signal. The read/write channel 22 includes such a reproduced-signal processing unit as shown in FIG. 2. In the reproduced-signal processing unit, the Viterbi decoder 34 decodes the reproduced-signal processing unit, thereby reproducing the servo data, i.e., bi-phase data.

In the reproduced-signal processing unit, the A/D converter 32 samples the waveform of the reproduced analog signal output from the CTF 31, as already described, at the pulse intervals of a clock signal synchronized with a sync signal that has been read from the preamble region included in the servo region of the disk 10. The A/D converter 32 samples the waveform of the reproduced analog signal, converting the amplitudes at the sampling points to digital values.

Further, the FIR filter 33, which is a digital waveform equalizer that comprises a digital filter, performs waveform equalization on the digital signal, changing the signal to one adaptive to the decoding ability of the Viterbi decoder 34. That is, the FIR filter 33 equalizes the waveform of the digital signal output from the A/D converter 32 so that the digital signal input to the Viterbi decoder 34 may have a response characteristic of $-(1-D^2)(1+D^2)=-1+2D^2-D^4$. In short, the FIR filter 33 performs waveform equalization on the input digital signal by using preset filter parameters, in order to generate a signal adaptive to the decoding ability of the Viterbi decoder 34.

Figure 10A:
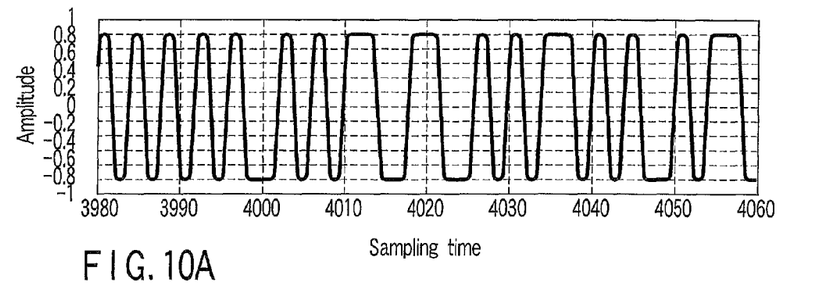
FIGS. 10A and 10B are diagrams explaining the operation of the reproduced-signal processing unit according to the embodiment.
Figure 10B:
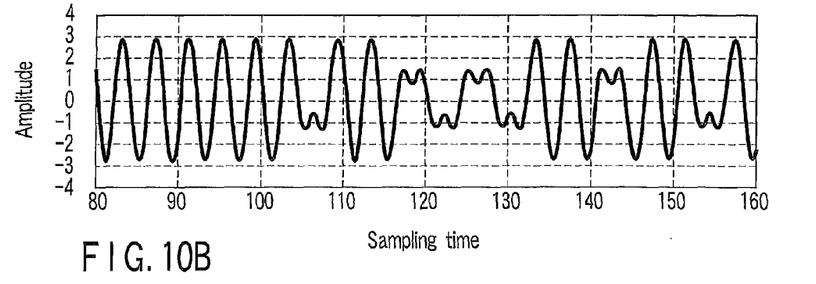

FIGS. 10A and 10B are diagrams explaining the waveforms of signals that may be reproduced from the disk 10 if neither dividing grooves 250 nor non-servo data parts 240 are provided in each servo region 100.

More specifically, FIG. 10A shows the waveform of a reproduced analog signal that corresponds to the servo data read by the head 12. FIG. 10B shows, for convenience of explanation, the waveform that an output of the FIR filter 33 might have if it were an analog signal. The digital signal input to the Viterbi decoder 34 represents the amplitude an analog signal has at the sampling point and can have four values for amplitude levels of ±1 and ±2.

Figure 11A:
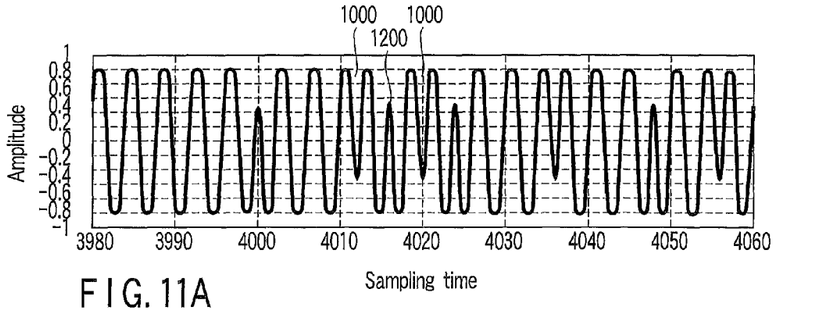
FIGS. 11A and 11B are other diagrams explaining the operation of the reproduced-signal processing unit according to the embodiment.
Figure 11B:
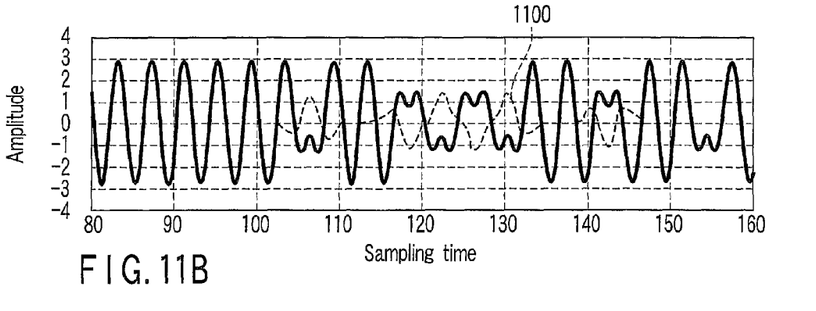

By contrast, FIGS. 11A and 11B are diagrams showing the waveforms of signals that are reproduced from the disk 10 in which dividing grooves 250 and non-servo data parts 240, which characterize this embodiment, are provided in each servo region 100.

More precisely, FIG. 11A shows the waveform of a reproduced analog signal that corresponds to the servo data read by the head 12. This reproduced analog signal has reproduced-waveform noise 1000. The noise 1000 has developed at a projecting magnetic region 220 which corresponds to bit pattern "1111" and which has a dividing grooves 250. At the space region 230, which corresponds to bit pattern "0000" and which has a non-servo data part 240, reproduced-signal waveform 1200 develops. The dividing grooves 250 and the non-servo data part 240 have a 4/7-bit width (=0.57) of the bi-phase modulated data.

FIG. 11B is a diagram showing, for convenience of explanation, the waveform that an output of the FIR filter 33, i.e., a signal input to the Viterbi decoder 34, might have if it were an analog signal. As evident from FIG. 11B, no equalization errors develop in the output of the FIR filter 33, as in the case of FIG. 10B, even if dividing grooves 250 and non-servo data parts 240 are provided in each servo region 100. The signal waveform (i.e., analog-signal waveform for convenience) 1100 is an output of the FIR filter 33, which corresponds to only the dividing grooves 250 and non-servo data parts 240. In this signal waveform 1100, the equalization errors resulting from the dividing grooves 250 are cancelled by the non-servo data parts 240. Therefore, the Viterbi decoder 34 receives an equalized digital signal that represents the amplitude an analog signal has at the sampling point and that can have four values for amplitude levels of $\pm 1$ and $\pm 2$. That is, the FIR filter 33 has equalized the digital signal, generating a signal that has response characteristic of $-1+2D^2-D^4$ of the Viterbi decoder 34.

Figure 13A:
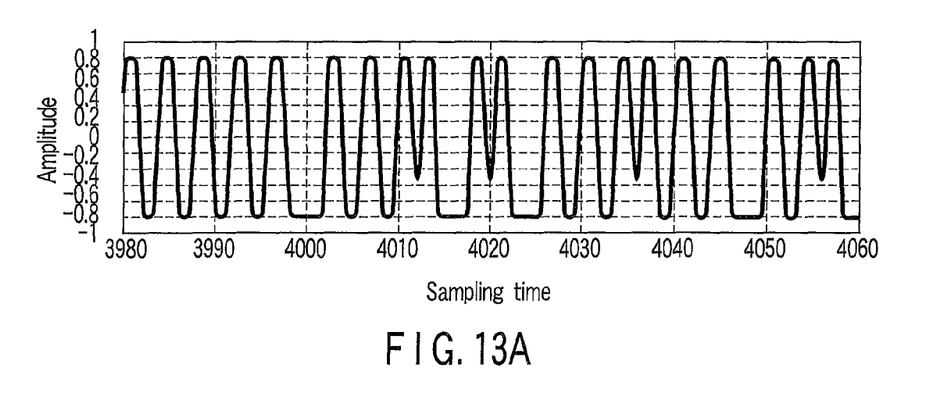
FIGS. 13A and 13B are diagrams explaining the advantage of the embodiment.
Figure 13B:
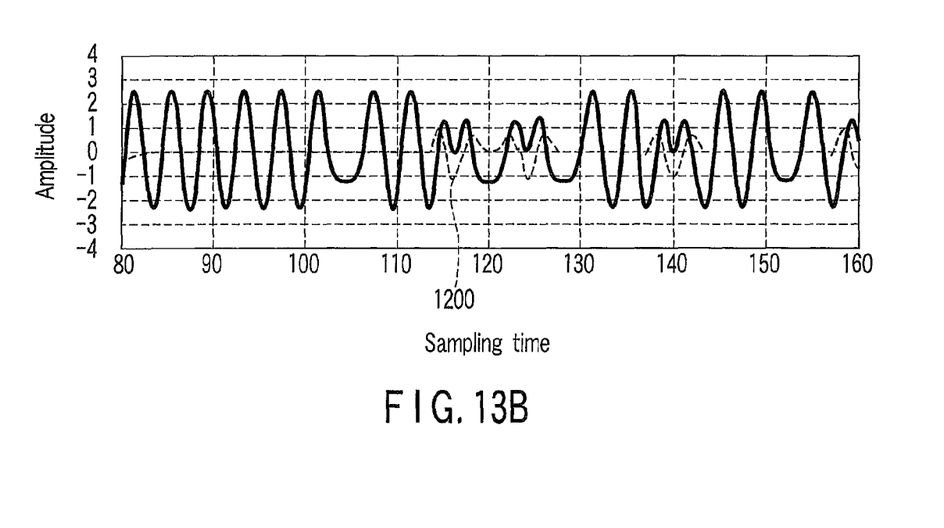

FIGS. 13A and 13B are diagrams explaining the waveforms of signals that may be reproduced from the disk 10 if only dividing grooves 250 are provided in each servo region 100 and if no non-servo data parts 240 are provided in the servo region 100. FIG. 13A shows the waveform of a reproduced analog signal that corresponds to the servo data read by the head 12. FIG. 13B shows the waveform of an output of the FIR filter 33, which is input to the Viterbi decoder 34. Signal waveform 1200 shown in FIG. 13B pertains to that part of the output of the FIR filter 33 which corresponds to a dividing grooves 250. If only dividing grooves 250 are provided in the servo region 100, the equalization error in the signal output from the FIR filter 33 cannot be completely eliminated, however, the parameters applied to the FIR filter 33 are adjusted. The signal waveform 1200 indicates that reproduction noise inevitably develops if no non-servo data parts 240 are provided in the servo region 100.

In both dividing grooves 250 and non-servo data parts 240 provided in each servo region 100, digital equalization adaptive to the response characteristic, i.e., decoding characteristic, of the Viterbi decoder 34 can be accomplished by adjusting the parameters applied to the FIR filter 33. That is, if the parameters applied to the FIR filter 33 are adjusted, the non-servo data parts 240 can, so to speak, cancel the reproduced-waveform noise resulting from the dividing grooves 250.

In brief, the reproduced-signal processing unit according to the present embodiment performs digital equalization adaptive to the response characteristic of the Viterbi decoder 34, to compensate for the equalization error resulting from the dividing grooves 250 that are provided, imparting a sufficiently flat surface to the disk 10.

(Modification of the Reproduced-Signal Processing Unit)

Figure 12:
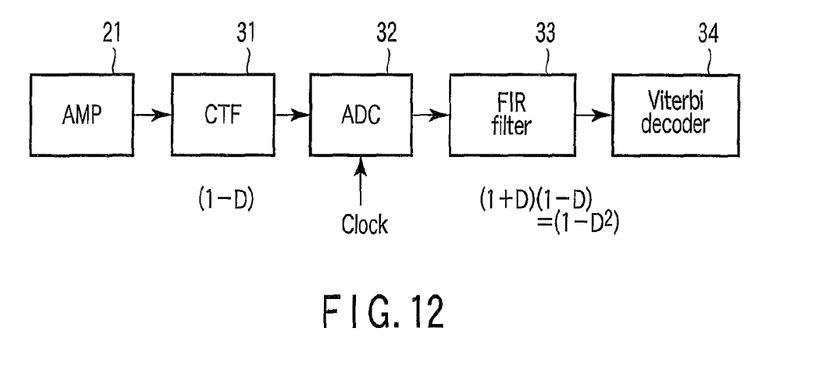
FIG. 12 is a block diagram explaining the structure of a modified reproduced-signal processing unit according to the embodiment.

FIG. 12 is a block diagram explaining the structure of a reproduced-signal processing unit according to the present embodiment.

In this reproduced-signal processing unit, the CTF 31 performs waveform equalization, providing a transfer function of almost $(1-D)$ if the transfer characteristic of the read channel included in the read/write channel 22 is modeled as transfer function $(1+D)$. Further, the FIR filter 33 performs digital waveform equalization on the output signal of the A/D converter 32, generating a signal (digital value) which has a response characteristic of $(1+D)(1-D)=(1-D^2)$ and which is input to the Viterbi decoder 34.

In the modified reproduced-signal processing unit, the Viterbi decoder 34 receives an equalized digital signal that represents the amplitude an analog signal has at the sampling point and that can have three values for amplitude levels of 0 and $\pm 1$. That is, the Viterbi decoder 34 decodes the servo data in accordance with response characteristic of $(1-D^2)$.

In the modified reproduced-signal processing unit of FIG. 12, too, no equalization errors develop in the output of the FIR filter 33 even if dividing grooves 250 and non-servo data parts 240 are provided in each servo region 100. Thus, the Viterbi decoder 34 receives an equalized digital signal that represents the amplitude an analog signal has at the sampling point and that can have three values for amplitude levels of 0 and $\pm 1$.

In the present embodiment, dividing grooves 250 and non-servo data parts 240 are provided in each servo region 100. The dividing grooves 250 impart a flat surface to the disk 10. The non-servo data parts 240 serve to achieve digital waveform equalization during the servo-data reproducing process, thereby generating a digital signal no longer having the reproduced-waveform noise resulting from the dividing grooves 250. The Viterbi decoder 34 therefore receives a digital signal free of equalization errors adaptive to the response characteristic, i.e., decoding ability, of the Viterbi decoder 34. This prevents the efficiency of decoding the servo data from being degraded.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A disk drive comprising:
   a head which reads and writes data;
   a disk which has a substrate, a data region and servo regions, the data region provided on the substrate and having data tracks formed and arranged in a radial direction of the disk, each track being constituted by a projecting magnetic layer, and each servo region provided on the substrate and having a bit pattern of servo data and comprising projecting magnetic layers and concave nonmagnetic layers; and
   a reproduced-signal processing unit which processes a reproduced signal read by the head from each servo region of the disk, thereby to decode the servo data,
   wherein in each servo region, dividing grooves of nonmagnetic layers are provided in a projecting region in which projecting magnetic layers lie one after another, each having a length equal to or larger than a prescribed length, as measured in a circumferential direction of the disk, each dividing groove being shorter than the prescribed length and dividing a projecting magnetic layer into parts, and non-servo data parts of magnetic layers are provided in a concave nonmagnetic region in which dividing grooves are continuously arranged for a distance equal to or longer than a prescribed distance in the circumferential direction of the disk, each non-servo data part being shorter than the prescribed distance and suppressing reproduction noise resulting from the dividing grooves,
   the servo data is recorded in each servo region, as encoded data generated by bi-phase encoding and being a data-bit train consisting of 0s and 1s; and the reproduced-signal processing unit includes a unit which decodes the data-bit train from the encoded data read by the head,
   in each servo region, the projecting regions correspond to "1111" which is included in a bit-pattern contained in the encoded data recorded as the servo data, and the concave regions correspond to "0000" which is included in the bit-pattern.

2. The disk drive of claim 1, wherein the dividing grooves and the non-servo data parts have a width less than one bit of the bit pattern, as measured in the circumferential direction of the disk.

3. The disk drive of claim 1, wherein each of the dividing grooves extends along a centerline of the projecting region n and divides the projecting region into a first part and a second part, in the circumferential direction of the disk.

4. The disk drive of claim 1, wherein each non-servo data part provided on the disk is a projecting magnetic layer extending along the centerline of the concave region.

5. The disk drive of claim 1, wherein in the data region provided on the disk, data tracks are spaced apart in the radial direction of the disk, by guard-band regions which are concave regions provided between the data tracks.

6. The disk drive of claim 5, wherein in the data region on the disk, the projecting regions and the concave regions have a prescribed length exceeding one-track width, as measured in the radial direction of the data tracks.

7. A disk drive comprising:
   a head which reads and writes data;
   a disk which has a substrate, a data region and servo regions, the data region provided on the substrate and having data tracks formed and arranged in a radial direction of the disk, each track being constituted by a projecting magnetic layer, and each servo region provided on the substrate and having a bit pattern of servo data and comprising projecting magnetic layers and concave nonmagnetic layers; and
   a reproduced-signal processing unit which processes a reproduced signal read by the head from each servo region of the disk, thereby to decode the servo data,
   wherein in each servo region, dividing grooves of nonmagnetic layers are provided in a projecting region in which projecting magnetic layers lie one after another, each having a length equal to or larger than a prescribed length, as measured in a circumferential direction of the disk, each dividing groove being shorter than the prescribed length and dividing a projecting magnetic layer into parts, and non-servo data parts of magnetic layers are provided in a concave nonmagnetic region in which dividing grooves are continuously arranged for a distance equal to or longer than a prescribed distance in the circumferential direction of the disk, each non-servo data part being shorter than the prescribed distance and suppressing reproduction noise resulting from the dividing grooves,
   the servo data is recorded in each servo region, as encoded data generated by bi-phase encoding and being a data-bit train consisting of 0s and 1s; and the reproduced-signal processing unit includes a unit which decodes the data-bit train from the encoded data read by the head,
   in each servo region, the projecting regions correspond to a pattern "1111" which is included in a bit-pattern contained in the encoded data recorded as the servo data, and the concave regions correspond to a pattern "0000" which is included in the bit-pattern; and the dividing grooves and the non-servo data parts have a width less than one bit of the pattern "1111" or "0000," as measured in the circumferential direction of the disk.

* * * * *